United States Patent
Nevarez

(10) Patent No.: US 7,849,021 B1
(45) Date of Patent: Dec. 7, 2010

(54) POOLING DATA IN SHARED DATA WAREHOUSE

(75) Inventor: Antonio Nevarez, San Diego, CA (US)

(73) Assignee: Teradata US, Inc., Miamisburg, OH (US)

(*) Notice: Subject to any disclaimer, the term of this patent is extended or adjusted under 35 U.S.C. 154(b) by 260 days.

(21) Appl. No.: 09/594,322

(22) Filed: Jun. 15, 2000

(51) Int. Cl.
*G06Q 20/00* (2006.01)

(52) U.S. Cl. .............................. 705/78; 705/1; 705/80

(58) Field of Classification Search ............. 705/78, 705/1, 80
See application file for complete search history.

(56) References Cited

U.S. PATENT DOCUMENTS

| | | | | |
|---|---|---|---|---|
| 5,638,519 A * | 6/1997 | Haluska | ........................ | 705/1 |
| 5,884,272 A * | 3/1999 | Walker et al. | ................. | 705/26 |
| 5,890,132 A * | 3/1999 | Sanders | ........................ | 705/7 |
| 6,141,754 A * | 10/2000 | Choy | ........................ | 705/52 |
| 6,254,001 B1 * | 7/2001 | Chan | ........................ | 235/375 |
| 6,301,574 B1 * | 10/2001 | Thomas et al. | ................ | 705/26 |
| 6,343,275 B1 * | 1/2002 | Wong | ........................ | 705/1 |
| 6,381,579 B1 * | 4/2002 | Gervais et al. | ................. | 705/8 |
| 6,389,429 B1 * | 5/2002 | Kane et al. | ..................... | 705/7 |
| 6,401,091 B1 * | 6/2002 | Butler et al. | .................. | 707/10 |
| 6,408,303 B1 * | 6/2002 | Richards | ........................ | 707/1 |
| 2002/0091533 A1 * | 7/2002 | Ims et al. | ........................ | 705/1 |
| 2002/0095381 A1 * | 7/2002 | Takahashi et al. | ............. | 705/44 |
| 2004/0049294 A1 * | 3/2004 | Keene et al. | .................. | 700/5 |
| 2004/0133493 A1 * | 7/2004 | Ford et al. | .................... | 705/35 |
| 2005/0038740 A1 * | 2/2005 | Ogilvie | ........................ | 705/40 |
| 2005/0289023 A1 * | 12/2005 | Hahn-Carlson et al. | ....... | 705/30 |
| 2006/0111956 A1 * | 5/2006 | Whitesage | .................... | 705/8 |
| 2007/0150387 A1 * | 6/2007 | Seubert et al. | ................ | 705/31 |
| 2009/0172035 A1 * | 7/2009 | Lessing et al. | ........... | 707/104.1 |

FOREIGN PATENT DOCUMENTS

JP  2004362289 A  * 12/2004

\* cited by examiner

*Primary Examiner*—Pierre E Elisca
(74) *Attorney, Agent, or Firm*—John Cowart

(57) ABSTRACT

A computer network is used to improve the profitability of one or more business entities. The network receives business-related data from at least two business entities and stores at least some of the data from each of the business entities in a common database. Then, in accordance with the terms of an agreement among the business entities, the network allows at least one of the business entities to receive information gathered from the common database.

25 Claims, 2 Drawing Sheets

POOLING DATA IN SHARED DATA WAREHOUSE

BACKGROUND

Many business entities, such as product retailers and financial institutions, collect and maintain large amounts of business information. The types of information that business entities routinely collect include data describing the products and services offered by the business entities, data describing the amounts and types of transactions involving those products and services, and data describing the customers who engage in those transactions.

These business entities often use very large parallel database systems, such as NCR Corporation's Teradata Active Data Warehouse system, to collect and maintain this raw data. More importantly, the business entities use data warehousing systems to analyze the raw data, retrieving and organizing the data in a manner that leads to a more complete and useful understanding of the business conducted by these entities. In many cases, data warehouses are used specifically to improve the quality and profitability of product or service delivery to customers. For example, the data stored in a data warehouse, when retrieved and organized in a certain manner, allows the owner of that data to profile and classify its customers and then study purchasing habits within those classes. Profiling in this manner allows the business entity to make more intelligent decisions in building and pricing its product supply.

In general, the data stored in a data warehousing system is limited to that which the owner of the system can collect through its normal business channels. Some business entities augment their data warehouses with purchased data or data obtained from other sources, e.g., through questionnaires or forms completed by customers on the promise of some benefit received in return. This type of data, however, still limits an entity's understanding of its own business or the preferences of its own customers.

SUMMARY

Described below is a system that enables business entities who share a common business interest, such as a common set of customers, products, or channels, to pool data collected during the course of business and analyze the pooled data. Pooling data in this manner gives each of the business entities a more complete understanding of its business than it would otherwise be able to achieve in analyzing only its own business data. Using an independent third-party broker to tightly control access to the pooled data ensures that each of the participating business entities can access only that data to which it is entitled under the data-sharing agreement.

One technique described below is useful in improving the profitability of one or more business entities. A computer system receives business-related data from at least two business entities and stores at least some of the data from each of the business entities in a common database. Then, in accordance with the terms of an agreement among the business entities, the computer system allows at least one of the business entities to receive information gathered from the common database.

Another technique is useful in operating a consortium among a number of distinct business to entities. The party responsible for managing the consortium collects business-related data gathered by the business entities. At some point, the business entities enter into an agreement for pooling the collected data in a shared data warehouse, and the managing party extracts information from the pooled data in accordance with the terms of this agreement. The managing party then delivers at least some of the extracted information to each of the business entities in the consortium.

The consortia described below are implemented, at least in some instances, in computer networks. The typical network includes one or more channels for use in receiving business-related data from at least two business entities and a shared database in which at least some of the business-related data is stored. The shared database includes a mechanism for use in granting a database access only in accordance with the terms of an agreement among the business entities. The computer network also includes a computer system that gathers information from the shared database when instructed to do so by a party having access to the database and then delivers the information to at least one of the business entities.

Other features and advantages will become apparent from the description and claims that follow.

DETAILED DESCRIPTION

Figure 1:
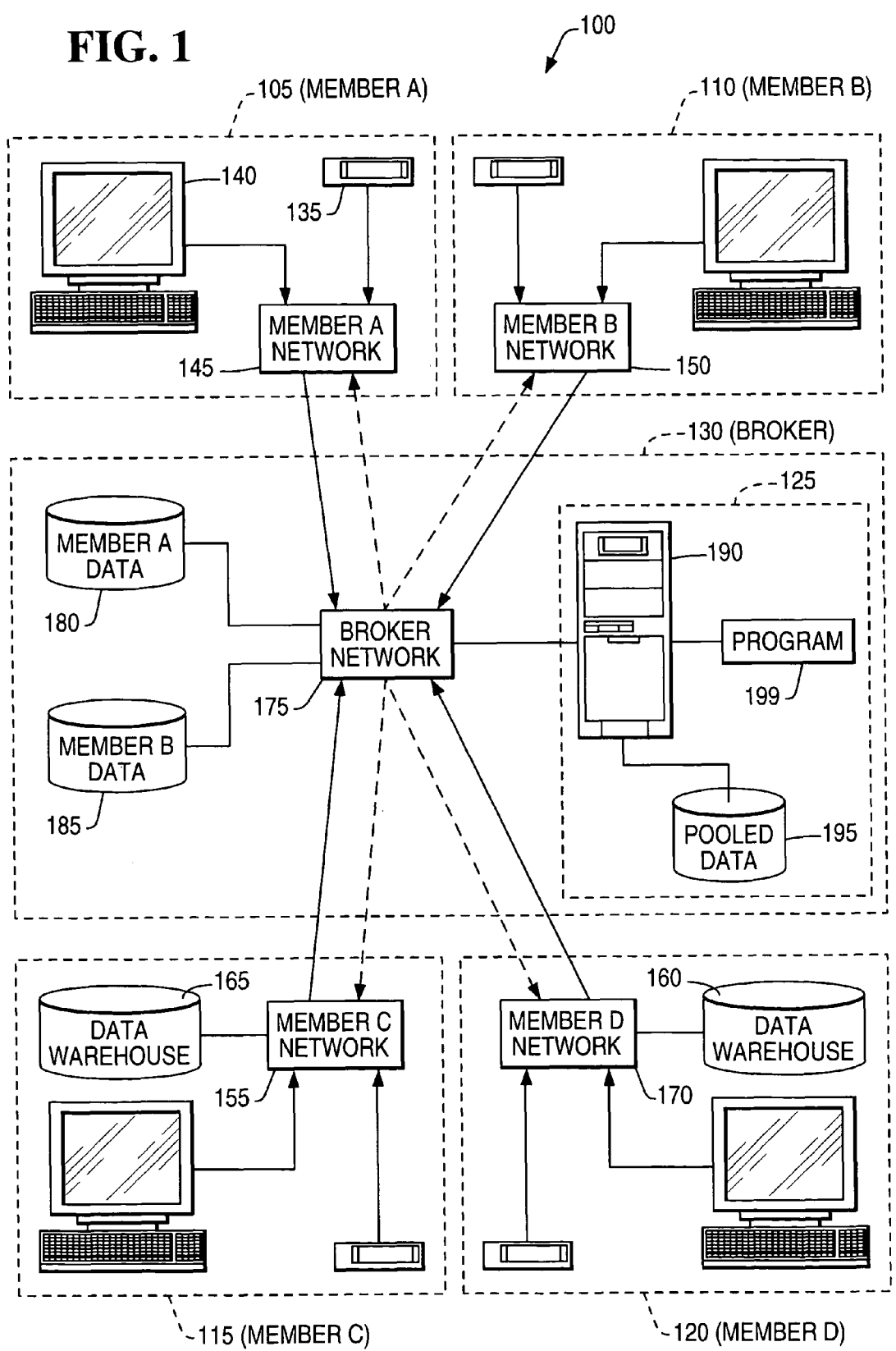
FIG. 1 is a schematic diagram of a network through which businesses pool business-related data in a shared data warehouse.

FIG. 1 shows a network 100 through which multiple business entities 105, 110, 115, 120 share business-related data in a shared data warehouse 125. The business entities may elect to share virtually any type of data, including consumer data that describes the consumers who purchase goods or services from the businesses; product data that describes the products or services delivered by the businesses; and operations data that describes the business operations carried out by the business entities.

In general, the participating businesses are separate legal entities, such as corporations, partnerships, and sole proprietorships, which have united under a negotiated agreement to form a data-sharing group, or consortium. Consortium members are usually unrelated businesses that share a common interest in some aspect of the business they conduct. For example, the businesses might share a common set of customers or participate at various stages of delivery of a common product or service. In many cases, the consortium includes the manufacturer of a product, a retailer of that product, and a shipper who delivers the product from one to the other. In some cases, the consortium includes businesses that are related entities, such as a parent corporation and its wholly- or partially-owned subsidiaries. The business entities that form the consortium usually are not direct competitors in the business areas for which they are willing to share data, but they typically harbor enough distrust that they are not willing to provide the other consortium members with direct or unrestricted access to their business data.

To ensure that each consortium member's access to the shared data is properly restricted and monitored, the participating businesses 105, 110, 115, 120 typically deliver the data to an independent, third-party service provider, or broker 130. The broker 130 maintains and often owns the data warehouse 125 into which the shared data is pooled. Access to the shared data warehouse 125 is governed by the terms of an agreement negotiated among the consortium members. The agreement might be negotiated by the consortium members themselves, or the broker 130 might lead the negotiation.

Some agreements grant direct access to the pooled data only the broker 130. Other agreements grant some level of restricted access to the consortium members. For example, the agreement might allow members to submit queries of only a certain type or of certain scope, or it might allow queries against only a portion of the data in the warehouse. In most situations, none of the consortium members is granted full, unrestricted access to the shared data. Conventional network security and privacy techniques, such as password protection, secure servers, and permissions, are used to restrict access to the shared data warehouse 125.

As described below, the broker 130 and/or the consortium members perform queries against the shared data, typically using a database-query tool that is based on a common database-query protocol, such as the Structured Query Language (SQL). Query results are delivered to the consortium members in accordance with the negotiated agreement.

The data stored in the shared data warehouse 125 is derived from a variety of sources, such as point-of-sale terminals 135, inventory-tracking terminals 140, and other data-collection systems connected to computer networks 145, 150, 155, 160 maintained by the consortium members. Many consortium members, such as members C and D in the example of FIG. 1, maintain their own data warehouses 165, 170 to store and analyze the data collected from these sources. Other consortium members, such as members A and B in this example, deliver data directly to the broker's computer network 175 without storing it locally in a data warehouse. In many cases, the broker 130 maintains separate data warehouses 180, 185 for some of the consortium members (e.g., members A and B in FIG. 1) and provides data warehousing services to these members under outsourcing agreements. In these situations, the broker 130 transfers data from the outsourced data warehouses 180, 185 to the shared data warehouse 125 in accordance with the terms of the data-sharing agreement. Likewise, the terms of the data-sharing agreement govern the transfer of data from the private data warehouses 165, 170 of other consortium members (e.g., members C and D in FIG. 1) into the shared data warehouse 125.

In general, there is no minimum or maximum limit on the amount of data stored in the shared data warehouse 125. Some consortia pool relatively small amounts of data, e.g., on the order of tens or hundreds of gigabytes. Many shared data warehouses, however, are very large, often exceeding tens or even thousands of terabytes (TB), especially when the consortium members are large national or international companies with many product or service offerings in many geographic locations. Shared data warehouses, like private data warehouses, also tend to grow rapidly. Therefore, a highly scalable data warehousing system that is capable of managing large amounts of data (e.g., hundreds or even thousands of terabytes) is best suited for use in a data-sharing consortium. The Teradata Active Data Warehouse system offered by NCR Corporation is one example of such a data warehousing system.

In general, the shared data warehouse 125 includes one or more computing systems 190 in the broker's network 175 that maintain the shared data in a storage facility 195, such as an array of magnetic or optical disks. Functions performed by the computing systems 190 include placing data into the shared warehouse, removing data from the warehouse, analyzing the pooled data, generating reports, and delivering the reports to the consortium members. The computing systems 190 also restrict access to the pooled data, applying a set of rules grant access only in a manner that is consistent with the terms of the negotiated agreement.

The computing systems 190 operate under the control of one or more computer programs 199, each consisting of computer-readable instructions stored on a persistent storage medium, such as a CD-ROM or a hard disk. In executing one of the programs, a computing system copies the instructions from the persistent storage medium into a temporary storage module, such as a random access memory (RAM) chip, and then executes the instructions from there.

Figure 2:
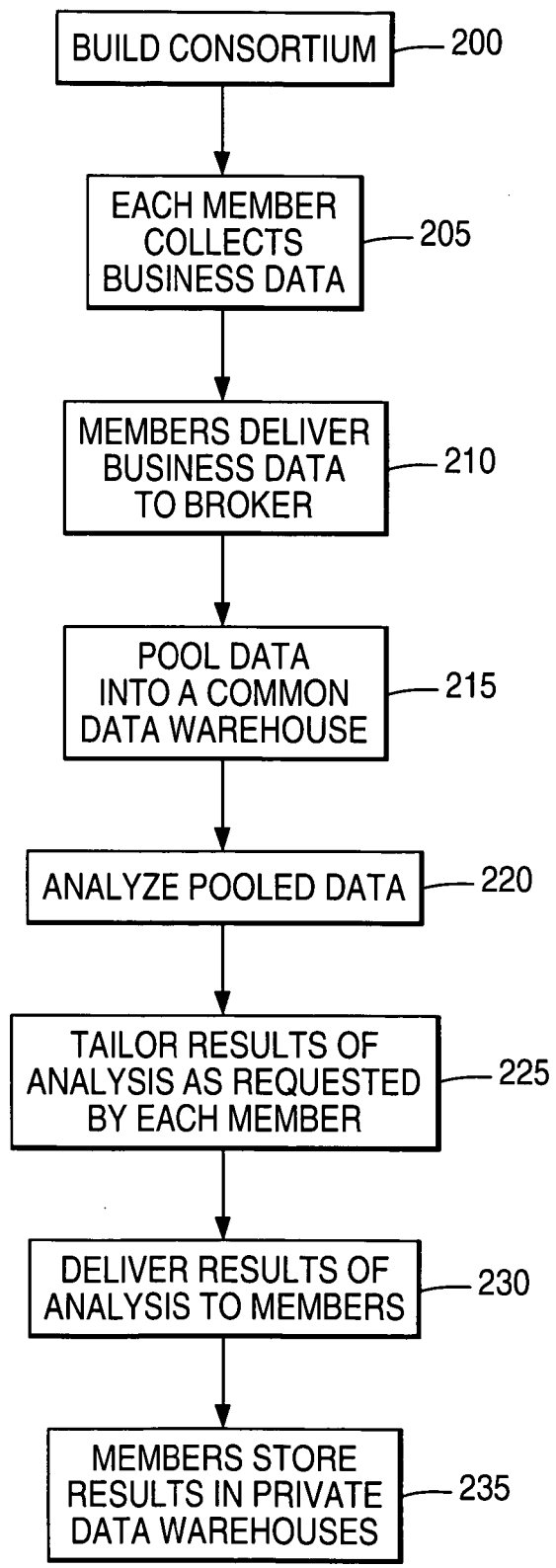
FIG. 2 is a flowchart of a technique for use in pooling and analyzing business-related data in a shared data warehouse.

FIG. 2 shows a technique for creating and using a shared data warehouse. Either the third-party broker or a prospective consortium member builds the consortium by approaching other prospective members and negotiating a data-sharing agreement among them (step 200). Once the consortium has been established, the members collect data about certain aspects of their businesses, such as the types, quantities, and prices of items sold in various geographic locations step 205). The members periodically deliver this data to the third-party broker, in accordance with the terms of the data-sharing agreement (step 210). The broker pools this data into the shared data warehouse (step 215). In general, the broker governs access to the data in the shared data warehouse.

When instructed by the consortium members, or at times previously agreed upon by the consortium members, the broker analyzes the pooled data in accordance with the terms of the data-sharing agreement (step 220). Analyzing the data usually involves performing a series of queries (e.g., SQL-based queries) against the shared data. The broker tailors the analysis, as well as the analysis results, to the requests of the individual consortium members (step 225). For example, one member might request information about the types of customers that purchase certain products ("customer profiling"), while another member might request information indicating whether any nexus exists between purchases of different types of products ("shopping cart analysis"). The broker then delivers the analysis results to the consortium members (step 230). In general, the consortium members store the analysis results locally, such as in data warehouses maintained by the individual consortium members (step 235).

In some embodiments, the broker delivers the analysis results to the consortium members in the form of reports. These reports are often generated from templates created by the broker in conjunction with the consortium members. Using report templates ensures that the consortium members all know in advance what type of information they can receive and in what form they will receive that information.

Sharing data in the manner described here provides many advantages to members of the data-sharing consortium, as well as to consumers. Members of a data-sharing consortium have access to more sources and types of business-related data than do their competitors. This gives the consortium members enhanced business knowledge and, thus, a competitive advantage over other companies. Sharing data also helps the participating businesses to discover unrecognized business opportunities. For example, a data-sharing arrangement between a manufacturer and a shipping company can help the shipping company increase its load efficiency, thus increasing its profits and reducing the manufacturer's shipping costs. Consumers benefit from these data-sharing arrangements through improved delivery and lower cost of products and services.

Using a third-party broker to maintain the shared data warehouse ensures the security and privacy of the raw data contributed by consortium members. A third-party broker also helps ensure adherence to the terms of the data-sharing agreement and fairness in distributing the costs and benefits of the shared data warehouse.

The text above describes the invention in terms of one or more specific embodiments. The invention also appears in a variety of alternative embodiments and thus is not limited to the embodiments described above. For example, in some embodiments, the third party broker maintains more than one shared data warehouse for each data-sharing consortium. The broker also frequently maintains shared data warehouses for more than one data-sharing consortium. In many cases, a particular business entity is a member of multiple consortia. The business entity might, in this situation, authorize the broker to place all or some portion of its data into the shared data warehouses for more than one of the consortia in which the business participates. In some embodiments, one or more of the consortium members, and not an independent third party, maintains the shared data warehouse. Accordingly, embodiments other than those described here are within the scope of the following claims.

What is claimed is:

1. A method for use in improving profitability of one or more business entities, the method comprising:
    receiving, by a computer, business-related data from at least two unrelated business entities, where the business-related data describes one or more aspects of the operations of each of the business entities;
    storing at least some of the business-related data from each of the business entities in a common database; and
    in accordance with the terms of an agreement among the business entities, allowing at least one of the business entities to receive information gathered from the common database, where the information includes data describing some aspect of a business relationship between at least one of the business entities and another entity that is not party to the agreement.

2. The method of claim 1, where allowing one of the business entities to receive information gathered from the common database includes gathering at least some of the information from data received from a business entity other than the one receiving the information.

3. The method of claim 1, where allowing one of the business entities to receive information gathered from the common database includes granting that business entity permission to gather the information directly from the common database.

4. The method of claim 1, where allowing one of the business entities to receive information gathered from the common database includes gathering the information on behalf of that business entity and then delivering the information to the business entity.

5. The method of claim 1, where storing data in the common database includes storing the data in a database maintained by an entity in the business of providing data warehousing services.

6. The method of claim 1, further comprising granting unrestricted access to the common database only to a third party named in the agreement among the business entities.

7. The method of claim 1, where storing data in the common database includes storing the data in a scalable data warehouse.

8. The method of claim 1, where storing data in the common database includes storing the data in a data warehouse having a total capacity of at least approximately one terabyte.

9. The method of claim 1, where storing data in the common database includes storing the data in a data warehouse having a total capacity of hundreds of terabytes.

10. The method of claim 1, where receiving business-related data includes receiving data that describes the customers of at least one of the business entities.

11. The method of claim 1, where receiving business-related data includes receiving data that describes the products offered by at least one of the business entities.

12. The method of claim 1, where receiving business-related data includes receiving consumer data and product data from the business entities.

13. The method of claim 1, where receiving business-related data includes occasionally receiving new data from the business entities.

14. The method of claim 1, where receiving business-related data includes receiving data that is also stored in a private data warehouse maintained by one of the business entities.

15. The method of claim 1, where receiving business-related data includes receiving data that is also stored in private data warehouse maintained on behalf of one of the business entities under a data-warehouse services agreement.

16. The method of claim 1, further comprising negotiating the agreement among the business entities in the group.

17. A method for use in operating a consortium among a number of distinct and unrelated business entities, the method comprising:
    collecting, by a computer, business-related data gathered by the unrelated business entities, where the business-related data describes one or more aspects of the operations of each of the business entities;
    applying an agreement negotiated among the entities for pooling the business-related data in a shared data warehouse;
    extracting information from the pooled data in accordance with terms of the negotiated agreement, where the information includes data describing some aspect of a business relationship between at least one of the business entities and another entity that is not party to the agreement; and
    delivering at least some of the extracted information to each of the business entities in the consortium.

18. The method of claim 17, where collecting business-related data includes pooling the data into a data warehousing system owned by a third party who does not contribute any of the pooled data.

19. The method of claim 17, where collecting business-related data includes pooling the data into a data warehousing system owned by a third party who is in the business of providing data warehousing services.

20. The method of claim 17, where applying the agreement includes applying an agreement drafted to include terms governing the types of data to be placed in the shared data warehouse.

21. The method of claim 17, where applying the agreement includes applying an agreement drafted to include terms governing access to the shared data warehouse.

22. The method of claim 17, where applying the agreement includes applying an agreement drafted to include terms governing the types of information that can be extracted from the shared data warehouse.

23. The method of claim 17, where applying the agreement includes applying an agreement drafted to include terms providing for payment of money in exchange for services provided by a third party selected to maintain the shared data warehouse.

24. A computer network comprising:
    one or more channels for use in receiving business-related data from at least two unrelated business entities, where the business-related data describes one or more aspects of the operations of each of the business entities; and a shared database comprising:
- a storage facility in which at least some of the business-related data received from each of the business entities is stored;
- a mechanism for use in granting database access only in accordance with the terms of an agreement among the business entities; and
- a computer system configured to:
  - gather information from the shared database when instructed to do so by a party having access to the database, where the information includes data describing some aspect of a business relationship between at least one of the business entities and another entity that is not party to the agreement; and
  - deliver the information to at least one of the business entities.

25. A computer program, stored on a computer-readable medium, for use in analyzing business-related data, the program comprising executable instructions that, when executed by a computer, cause the computer to:
- receive business-related data from at least two unrelated business entities, where the business-related data describes one or more aspects of the operations of each of the business entities;
- store at least some of the business-related data received from each of the business entities in a shared database;
- grant database access only in accordance with the terms of an agreement among the business entities;
- gather information from the shared database when instructed to do so by a party having access to the database, where the information includes data describing some aspect of a business relationship between at least one of the business entities and another entity that is not party to the agreement; and
- deliver the information to at least one of the business entities.

* * * * *